US009567225B2

(12) United States Patent
Lin et al.

(10) Patent No.: US 9,567,225 B2
(45) Date of Patent: Feb. 14, 2017

(54) SINGLE-STEP, SOLVENT-FREE, CATALYST-FREE PREPARATION OF HOLEY CARBON ALLOTROPES

(71) Applicant: The United States of America as represented by the Administrator of the National Aeronautics and Space Administration, Washington, DC (US)

(72) Inventors: Yi Lin, Yorktown, VA (US); Jae-Woo Kim, Newport News, VA (US); John W. Connell, Yorktown, VA (US); Michael R. Funk, Hampton, VA (US); Caroline J. Campbell, Yorktown, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 14/513,813

(22) Filed: Oct. 14, 2014

(65) Prior Publication Data
US 2015/0104372 A1    Apr. 16, 2015

Related U.S. Application Data

(60) Provisional application No. 61/961,355, filed on Oct. 11, 2013.

(51) Int. Cl.
    *C01B 31/04*    (2006.01)
    *C01B 31/08*    (2006.01)
    *C01B 31/02*    (2006.01)

(52) U.S. Cl.
    CPC .......... *C01B 31/08* (2013.01); *C01B 31/0213* (2013.01); *C01B 31/0253* (2013.01); *C01B 31/04* (2013.01);
(Continued)

(58) Field of Classification Search
    CPC ... C01B 31/02; C01B 31/0484; C01B 31/0438
(Continued)

(56) References Cited

U.S. PATENT DOCUMENTS 6,337,302 B1 * 1/2002 Teng ................. C01B 31/10
                                                                423/445 R
7,001,581 B2    2/2006 Kawakami
(Continued)

FOREIGN PATENT DOCUMENTS

CN    WO 2012088683 A1 *  7/2012 ............. H01G 11/36

OTHER PUBLICATIONS

Hazra, K. S., et al. "Thinning of multilayer graphene to monolayer graphene in a plasma environment." Nanotechnology 22.2 (2011): 025704.*
(Continued)

Primary Examiner — Richard M Rump
(74) Attorney, Agent, or Firm — Jennifer L. Riley (57) ABSTRACT

Methods for forming holey carbon allotropes and graphene nanomeshes are provided by the various embodiments. The various embodiments may be applicable to a variety of carbon allotropes, such as graphene, graphene oxide, reduced graphene oxide, thermal exfoliated graphene, graphene nanoribbons, graphite, exfoliated graphite, expanded graphite, carbon nanotubes (e.g., single-walled carbon nanotubes, double-walled carbon nanotubes, few-walled carbon nanotubes, multi-walled carbon nanotubes, etc.), carbon nanofibers, carbon fibers, carbon black, amorphous carbon, fullerenes, etc. The methods may produce holey carbon allotropes without the use of solvents, catalysts, flammable gas, additional chemical agents, or electrolysis to produce the pores (e.g., holes, etc.) in the carbon allotropes. In an
(Continued)

hG₀-450-1h embodiment, a carbon allotrope may be heated at a working window temperature for a working period of time to create holes in the carbon allotrope.

19 Claims, 12 Drawing Sheets

(52) U.S. Cl.
CPC ....... *C01B 31/0423* (2013.01); *C01B 31/0484* (2013.01); *C01P 2006/16* (2013.01)

(58) Field of Classification Search
USPC .............................. 423/445 B, 460, DIG. 40
See application file for complete search history.

(56) References Cited

U.S. PATENT DOCUMENTS

| 2013/0230709 | A1* | 9/2013 | Zhou ...................... H01G 11/36 428/219 |
| 2013/0315816 | A1 | 11/2013 | Watson et al. | |

OTHER PUBLICATIONS

Liu, Jinyang, et al. "Fabrication of graphene nanomesh and improved chemical enhancement for Raman spectroscopy." The Journal of Physical Chemistry C 116.29 (2012): 15741-15746.*
Mukherjee, Rahul, et al. "Photothermally reduced graphene as high-power anodes for lithium-ion batteries." Acs Nano 6.9 (2012): 7867-7878.*
Cote, Laura J., Rodolfo Cruz-Silva, and Jiaxing Huang. "Flash reduction and patterning of graphite oxide and its polymer composite." Journal of the American Chemical Society 131.31 (2009): 11027-11032.*
Geim, "Graphene: Status and Prospects", Science, vol. 324, pp. 1530-1634, (Jun. 19, 2009).
Allen, et al., "Honeycomb Carbon: A Review of Graphene", Chem Rev. 110(1), pp. 132-145, (2010).
Zhu, et al., "Graphene and Graphene Oxide: Synthesis, Properties and Applications", Adv. Mater., 22, 3906, (Sep. 15, 2010).
Dai, "Functionalization of Graphene for Efficient Energy Conversion and Storage", Acc. Chem. Res., vol. 46, Issue 1, pp. 1-190, (2013).
Banhart, et al., "Structural Defects in Graphene", ACS Nano, 4, pp. 26-41, (2011).
Terrones, et al., "The Role of Defects and Doping in 2D Graphene Sheets and ID Nanoribbons", Rep. Prog. Phys. 75, 062501, (2012).
Bai, et al., "Graphene Nanomesh", Nat. Nanotechnol., vol. 5, pp. 190-194, (2010).
Sinitskii, et al., "Patterning Graphene through the Self-Assembled Templates: Toward Periodic Two-Dimensional Graphene Nanostructures with Semiconducint Properties", J. Am. Chem. Soc., 132, 14730. (2010).
Liang, et al., "Formation of Bandgap and Subbands in Graphene Nanomeshes with Sub-10 nm Ribbon Width Fabricated via Nanoimprint Lithography", Nano Lett., 10, 2454, (2010).
Akhavan, "Graphene Nanomesh by ZnO Nanorod Photocatalysts", ACS Nano, vol. 4, Issue 7, pp. 4174-4180, (Jul. 27, 2010).
Zeng, et al., "Fabrication of Graphene Nanomesh by Using an Anodise Aluminum Oxide Membrane as a Template", Adv. Mater. 24, 4138, (2012).
Liu, et al., "Fabrication of Graphene Nanomesh and Improved Chemical Enhancement for Raman Spectroscopy", J. Phys. Chem. C., 116, pp. 15741-15746, (2012).
Paul, et al., "Graphene Nanomesh as Highly Sensitive Chemiresistor Gas Sensor", Anal. Chem., vol. 64, Issue 19, pp. 8171-8178, (2012).
Wang, et al., "CVD Growth of Large Area Smooth-Edged Graphene Nanomesh by Nanosphere Lithography", Sci. Rep. 3, 1238, (2013).
Zhao, et al., "Flexible Holey Graphene Paper Electrodes with Enhanced Rate Capability for Energy Storage Appilcations", ACS Nano, vol. 5, Issue 11, pp. 8739-8749, (Nov. 22, 2011).
Zhao, et al., "In-Plane Vacancy-Enabled High-Power Si-Graphene Composite Electrode for Lithium-Ion Batteries", Adv. Energy Mater., vol. 1, Issue 6, pp. 1079-1084, (Nov. 2011).
Kotchey, et al., "The Enzymatic Oxidation of Graphene Oxide", ACS Nano, vol. 5, Issue 3, pp. 2098-2108, (Mar. 22, 2011).
Han, et al., "Steam Etched Porous Graphene Oxide Network for Chemical Sensing", J. Am. Chem, Soc., vol. 133, Issue 30, pp. 15264-15267, (2011).
Lin, et al., "Bulk preparation of holey graphene via controlled catalytic oxidation", Nanosoale, vol. 5, DOI: 10.1039/c3nr02135a, pp. 7814-7824, (2013).
Schniepp, et al., "Functionalized Single Graphene Sheets Derived from Splitting Graphite Oxide", J. Phys. Chem. B, vol. 110, Issue 17, pp. 8535-8539, (Apr. 11, 2006).

* cited by examiner

SINGLE-STEP, SOLVENT-FREE, CATALYST-FREE PREPARATION OF HOLEY CARBON ALLOTROPES

CROSS REFERENCE TO RELATED APPLICATIONS

This patent application claims the benefit of and priority to U.S. provisional patent application No. 61/961,355 entitled "Single-Step, Solvent-Free, Catalyst-Free Preparation of Holey Carbon Allotropes," filed on Oct. 11, 2013, the entire contents of which are hereby incorporated by reference in their entirety.

STATEMENT REGARDING FEDERALLY SPONSORED RESEARCH OR DEVELOPMENT

The embodiments described herein were conceived in the performance of work under a NASA contract or cooperative agreement and by employees of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor or cooperative agreement recipient elected not to retain title.

FIELD OF THE INVENTION

The present invention relates to holey graphenes, graphene nanomeshes, holey carbon nanotubes, holey carbon nanofibers, and/or other holey carbon allotropes, and more particularly to the formation of holey graphenes, graphene nanomeshes, holey carbon nanotubes, or holey carbon nanofibers.

BACKGROUND OF THE INVENTION

Graphene sheets are two-dimensional, conjugated carbon structures which are only one to a few atoms thick. Graphene sheets are currently among the most studied nanomaterials for potential applications in electronics, energy harvesting, conversion, and storage, polymer composites, and others. Graphene sheets with the most ideal structures are experimentally obtained via mechanical exfoliation (for example, via the "Scotch Tape" method), which only produces very small quantities. For the bulk preparation of graphene, one of the most popular methods typically starts with strong oxidation of natural graphite into graphene oxide (GO) that is dispersible in aqueous solutions as exfoliated monolayer or few-layered sheets. The exfoliated GO sheets may then be chemically or thermally converted into graphene—or more accurately "reduced graphene oxide" (rGO). Compared to the graphene sheets prepared from mechanical exfoliation or chemical vapor deposition methods, chemically exfoliated rGO sheets typically have more defects.

SUMMARY

The various embodiments provide methods for forming holey carbon allotropes and graphene nanomeshes. The various embodiments may be applicable to a variety of carbon allotropes, such as graphene, graphene oxide, reduced graphene oxide, thermal exfoliated graphene, graphene nanoribbons, graphite, exfoliated graphite, expanded graphite, carbon nanotubes (e.g., single-walled carbon nanotubes, double-walled carbon nanotubes, few-walled carbon nanotubes, multi-walled carbon nanotubes, etc.), carbon nanofibers, carbon fibers, carbon black, amorphous carbon, fullerenes, etc. The various embodiments may produce holey carbon allotropes without the use of solvents, catalysts, flammable gas, additional chemical agents, or electrolysis to produce the pores (e.g., holes, etc.) in the carbon allotropes. In an embodiment, a carbon allotrope may be heated at a working window temperature for a working period of time to create pores (e.g., holes, etc.) in the carbon allotrope. In the various embodiments, the working window temperature may be from about 100° C. to about 800° C. In the various embodiments, the working period of time may be less than 1 minute to about 1440 minutes (i.e., about 24 hours). The working period of time may include the time to heat the carbon allotrope to the working window temperature. The holes or pores created in the embodiment holey carbon allotropes via the various embodiment methods may range in size from a radius of about 1 nanometer to about 100 nanometers. The embodiment holey carbon allotropes may be incorporated into various devices, such as an electrode for an electrochemical device.

These and other features, advantages, and objects of the present invention will be further understood and appreciated by those skilled in the art by reference to the following specification, claims, and appended drawings.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Graphene sheets prepared from any method may include intrinsic defects. Typical types of defects on graphene surface are Stone-Wales (pentagon-heptagon pairs) for vacancy sites, which are mostly of nanometer sizes. Recently, there have been a few reports on types of graphene structures which are featured with large pore openings (i.e., holes) on the conjugated carbon surface. Compared to conventionally termed defects that often take extensive efforts to observe using high-resolution microscopic techniques, the pore openings in these holey graphene (hG) structures are much larger (ranging from a few nanometers to hundreds of nanometers) and are thus easily identified. The hG structures obtained from lithographic methods, often referred to as "graphene nanomeshes", usually have spherical hole geometry with controlled sizes. For example, phase-segregated domains of polystyrene-poly(methyl methacrylate) diblock copolymers have been advantageously used as the starting templates for the lithographic preparation of secondary $SiO_2$ nanomesh masks via reactive ion etching. The porous $SiO_2$ mask, on top of a graphene flake, may then be placed under oxygen plasma for the removal of exposed carbon atoms underneath. This may result in supported or freestanding (upon lift-off) graphene nanomeshes with spherical holes of a few nanometers to tens of nanometers in diameter with various periodicities. In another example, a very similar lithographic process may be used with a porous polystyrene resist layer obtained with the use of an imprint template. The periodic holes on the graphene nanomeshes may induce interesting tunable semiconducting properties that may result in transistor devices for unique electronic applications.

An obstacle for the nearly perfectly structured "graphene nanomeshes" in applications beyond electronics may be that the graphene nanomeshes may only be prepared on a substrate-level and may not be readily scalable. Alternatively, hGs may be obtained from oxidative methods in larger quantities, despite somewhat less controlled pore geometries, periodicities and size distributions than those found in the graphene nanomeshes. For example, the sonication of an aqueous mixture of dispersed graphene oxide (GO) and concentrated nitric acid may result in GO sheets (and upon reduction, "reduced graphene oxide" (rGO) sheets) having holes of various sizes. Such hG films obtained via filtration may show high performance in lithium ion storage, which may be attributed to enhanced ion diffusion channels due to the holes on the graphitic surface. In another example, a mild enzyme treatment using horseradish peroxidase may catalyze the oxidation of GO, resulting in holey GO sheets with hole sizes gradually increased over the course of the reactions (up to a few weeks). The same enzyme treatment may be ineffective toward rGO, which may be attributed to less dynamic enzyme functions. As a further example, holey carbon allotropes may be prepared using a catalytic controlled oxidation method.

The less controlled pore (e.g., hole, etc.) geometries, periodicities and size distributions of hGs obtained from oxidative methods than those found in the graphene nanomeshes may be overcome, in whole or in part, via embodiment processes to prepare holey carbon nanomaterials without the need for a catalyst. In this manner, the various embodiments contained herein may enable holey carbon nanomaterials to be prepared without the need for a catalyst and further allow the holey carbon nanomaterials to have more controlled pore (e.g., hole, etc.) geometries, periodicities, and size distributions than hGs obtained from oxidative methods. The various embodiments may provide holey graphenes, graphene nanomeshes, holey carbon nanotubes, or holey carbon nanofibers formed without the need for any solvents or catalysts, for example, by air oxidation methods.

The various embodiments may provide holey carbon allotropes or graphene nanomeshes. The various embodiments may provide carbon allotropes formed by solvent free and catalyst free oxidation. The various embodiments may provide holey carbon allotropes in scalable quantities. The various embodiments may provide holey carbon allotropes with minimal defects. The various embodiments may provide facile and well controllable methods for preparing carbon allotrope structures, which include pores (e.g., holes, etc.) in and on the surfaces. The various embodiments may provide a method for preparing carbon allotrope structures that may have controlled pore (e.g., hole, etc.) sizes on the graphitic surface. The various embodiments may provide a method for preparing carbon allotrope structures that may be readily scalable. The various embodiments may be accomplished in a simple and cost effective manner.

In some embodiments, a method may be provided for forming holey graphenes by a controlled process that does not require any solvents or catalysts. The method may be applicable to a variety of carbon allotropes, such as carbon nanotubes, graphene, carbon nanofibers, graphite, and exfoliated graphite. The method may be superior to current techniques in that it may be completed rapidly in a single step with minimal product work-up requirements and may not require solvent, catalyst, flammable gasses, additional chemical agent(s), or electrolysis to form the holey carbon allotropes.

The various embodiments for producing holey carbon allotropes may require only commercially available materials, standard laboratory equipment (e.g., an oven), short reaction times, and the various embodiment methods may be readily scalable. The holey carbon allotropes produced by the embodiment methods may have a novel combination of properties that are useful in a variety of applications. The carbon allotrope may be any carbon allotrope such as, for example, graphene, graphene oxide, reduced graphene oxide, thermal exfoliated graphene, graphene nanoribbons, graphite, exfoliated graphite, expanded graphite, single-walled carbon nanotubes, double-walled carbon nanotubes, few-walled carbon nanotubes, multi-walled carbon nanotubes, carbon nanofibers, carbon fibers, carbon black, amorphous carbon, or fullerenes. In the embodiment methods, a carbon allotrope may be heated to a specified temperature range and time period, in air, during which partial carbon gasification and the formation of pores (e.g., holes, etc.) in and on the graphitic carbon allotrope surface may occur. Specifically, the embodiment methods may involve heating the carbon allotrope by providing sufficient energy to the carbon allotrope in order to reach an elevated temperature for a defined period of time. In the various embodiments, the forms of energy that may be used to heat the carbon allotrope may include, but are not limited to, thermal, mechanical, microwave, infrared, laser beam and other forms of irradiation. In some embodiments, the elevated temperature range can be about 100° C. to about 800° C., more specifically about 300° C. to about 600° C. In some embodiments, the preferred time range for maintaining the elevated temperature can be about 1 minute to about 1440 minutes, more specifically about 10 minutes to about 600 minutes. The resulting materials produced from the various embodiment methods may be novel structures that consist of the carbon allotrope with pores (e.g., holes, etc.) with sizes ranging from about 1 nanometer to about 100 nanometers.

In an embodiment, the holey carbon allotrope may be prepared by heating the precursor carbon allotrope to a temperature of about 100° C. to about 800° C., or more specifically about 300° C. to 600° C. The oxidation of the precursor carbon allotrope may occur at a temperature between 150° C. and 600° C. The heating may be provided by energy input such as, for example, thermal, electrical, mechanochemical, electrochemical, electron bombardment, ion bombardment, electromagnetic, infrared, and/or laser beam based energy inputs. The resulting holey carbon allotrope may be incorporated into an electrode as a platform for an electrochemical device. Electrodes may be prepared according to the embodiment methods described herein.

Structural manipulations of the two dimensional graphene surface have been of significant interest as a method of tuning the properties of the nanosheets for enhanced performance in various applications. The various embodiments may provide straightforward yet highly scalable methods to prepare bulk quantities of "holey graphenes", which may be graphene sheets with pores (e.g., holes, etc.) ranging from about 1 nanometer to about 100 nanometers in diameter. In the various embodiments, to prepare these holey graphenes, a substrate may be placed at elevated temperatures for a specified amount of time. The temperature and time of the oxidation processes may strongly affect the morphology and sizes of the pores formed in the various embodiments. Characterization results of the holey graphene products produced via the various embodiment methods suggests that the pore generation may start from defect-rich regions present on the starting graphene sheets. As a result, the remaining graphitic carbons on the holey graphene sheets may be highly crystalline, with no significant increase of the overall defect density despite the presence of structural pores.

The various embodiments provide a facile and well controllable procedure to prepare holey carbon allotrope structures, which include pores on the carbon allotrope surfaces created by an air oxidation. In comparison to conventional methods to prepare holey graphenes, the various embodiment methods are simple, practical, and less expensive, and also readily scalable. In this manner, the various embodiments enable more convenient use of holey carbon allotrope materials, such as holey graphenes, in many applications that require bulk quantities, such as polymeric composites and energy storage devices.

In some embodiments of the method, a commercially available starting graphene material may be prepared from a process similar to the thermal reduction/exfoliation of GO ("thermally exfoliated graphene" (TEG)). The preparation of holey graphenes (hG) may be a single step process, once the starting graphene material is provided/prepared, in which the starting graphene material may be treated at a specified temperature for a specified amount of time in an air atmosphere.

The various embodiments may produce holey carbon materials having increased surface areas and improved thermo-electric properties, without significantly reducing the mechanical and electrical properties of the carbon materials. The presence of pores (e.g., holes, etc.) in the holey carbon materials produced by the described methods may enable increased functional groups to be allowed for at the edges newly created in the embodiment materials. The various holey carbon materials produced by the various embodiment methods may provide holey carbon materials for use in high-performance electrode materials, which are useful in energy conversion and energy storage devices such as solar cells, supercapacitors, batteries, thermoelectric materials having reduced thermal conductivity with retained electrical conductivity, stretchable electronic devices, composite fillers, improved catalytic substrates, gas storage, drug delivery, etc. The holey carbon materials of the various embodiments may be of higher flexibility than the originally provided parent materials. In the case of carbon nanotubes, the embodiment methods may help increase the useful surface area by making the nanotube interior much more accessible to a variety of entities including but not limited to gasses, liquids, organic molecules, proteins and other biological molecules, polymers, and nanoparticles, thus making the product more suitable for applications such as gas storage entities or drug/gene delivery vectors. In the case of graphene, the various embodiment methods may help increase flexibility through the introduced pores on the graphene sheets for stretchable transparent electronic devices without reducing the mechanical and electrical properties of the graphene sheets. The various embodiment methods described herein may be accomplished with standard laboratory equipment in a simple preparation procedure. In addition, unlike conventional techniques, the various embodiment methods may be scaled-up without the need for highly specialized equipment. In a further comparison to catalytic oxidation techniques to prepare holey carbon allotropes, the various embodiment methods may not require any catalysts and may be achieved in a single, solvent-free step.

The various embodiments may provide holey carbon allotrope platforms for energy storage and other potential use such as thermo-electric devices, polymer composites, hydrogen storage media, substrates for improved catalysts, stretchable electronic devices, and drug/gene delivery vehicles. The various embodiments include heating a carbon allotrope to a defined temperature window and period of time in air, which may result in partial carbon gasification, leading to the formation of pores (e.g., holes, etc.) on the graphitic carbon allotrope surface. The various embodiment methods developed may allow for the preparation of holey carbon allotropes using common laboratory equipment, such as an oven, with no additional chemicals required. In addition, the various embodiment methods may be easily scalable without the need for highly specialized equipment. The methods may consistently produce narrow size distribution of pores, especially those of sub 10 nanometers, on the carbon allotrope. The results of these pores may be that a variety of properties of the embodiment holey materials, such as surface area, pore volume, mechanical properties, electrical conductivity, thermal conductivity, and thermopower may be controlled.

Figure 1:
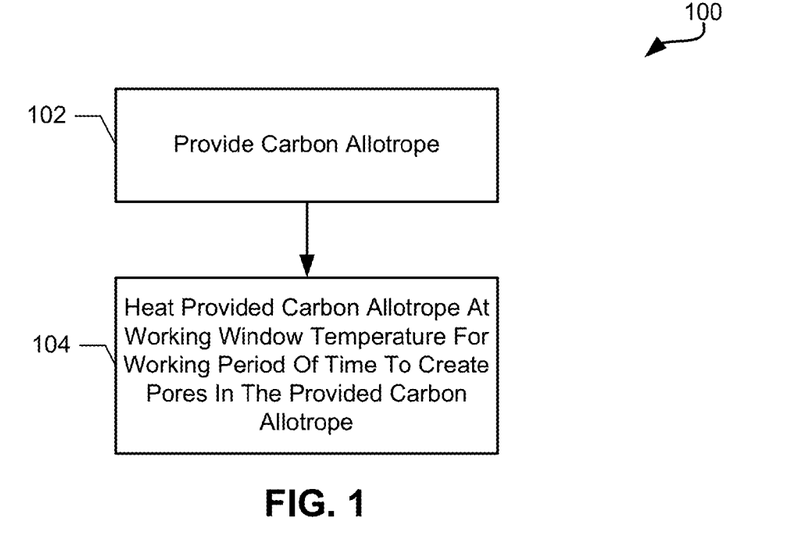
FIG. 1 is a process flow diagram illustrating an embodiment method for creating holey carbon allotropes.

FIG. 1 is a process flow diagram illustrating an embodiment method 100 for creating holey carbon allotropes (i.e., carbon allotropes that have pores (e.g., holes, etc.) in them) without the use of solvents or any catalysts. The method 100 may be applicable to a variety of carbon allotropes, such as graphene, graphene oxide, reduced graphene oxide, thermal exfoliated graphene, graphene nanoribbons, graphite, exfoliated graphite, expanded graphite, carbon nanotubes (e.g., single-walled carbon nanotubes, double-walled carbon nanotubes, few-walled carbon nanotubes, multi-walled carbon nanotubes, etc.), carbon nanofibers, carbon fibers, carbon black, amorphous carbon, fullerenes, etc. The method 100 may produce holey carbon allotropes without the use of solvents, catalysts, flammable gas, additional chemical agents, or electrolysis to produce the pores (e.g., holes, etc.) in the carbon allotropes. In block 102 a carbon allotrope may be provided. Providing the carbon allotrope may comprise placing an amount of carbon allotrope into heating equipment, such as an oven, a furnace, etc. For example, a carbon allotrope may be provided by preparing a starting graphene material, such as graphene powder, from natural graphite and placing the starting graphene material in an open-ended tube furnace. As other examples, a carbon allotrope may be provided by placing macroscopic assemblages of carbon allotropes, such as multi-walled nanotube (MWNT) sheets, few-walled nanotube (FWNT) sheets, or carbon nanotube (CNT) sheets, in an oven or open-ended furnace. In various embodiments, the provided carbon allotrope may be of any form, such as one or more of a sheet, mat, roving, yarn, thread, filament, etc. Regardless of the form of the provided carbon allotrope, the constituents of the form of the provided carbon allotrope may be aligned or unaligned. For example, the constituents of the form of the provided carbon allotrope may be at least partially aligned in a same direction.

In block 104 the provided carbon allotrope may be heated at a working window temperature for a working period of time to create pores (e.g., holes, etc.) in the provided carbon allotrope. The heat may be applied to the provided carbon allotrope via the heating equipment the carbon allotrope is placed in, such as, for example, an oven, a furnace, etc. The heat may be provided by various methods, either singularly or in combination, including thermal heating methods, mechanical heating methods, microwave heating methods, infrared heating methods, laser beam heating methods, mechanochemical heating methods, electrochemical heating methods, electron bombardment, ion bombardment, electromagnetic heating methods, or any other form of heat or irradiation that can be used to heat the carbon allotrope. In an embodiment, the provided carbon allotrope may be heated in air. In other embodiments, the provided carbon allotrope may be heated in other gases or gas mixtures such as, for example, air, oxygen, carbon dioxide, carbon monoxide, nitrogen, argon, any other inert gas, and any combinations of the foregoing. The working window temperature may be the working temperature of the heating equipment used to heat the provided carbon allotrope. The working window temperature may be from about 100° C. to about 800° C. For example, the working window temperature may be a temperature range from about 100° C. to about 800° C. maintained during heating, such as about 100° C. to about 800° C., about 150° C. to about 500° C., about 300° C. to about 500° C., about 300° C. to about 600° C., about 400° C. to about 550° C., etc. As another example, the working window may be a set temperature from about 100° C. to about 800° C. maintained during heating, such as 350° C., 400° C., 450° C., 500° C., 550° C., 600° C., etc. The working period of time may be the period of time for which heat is applied to the provided carbon allotrope. The working period of time may include the time to heat the provided carbon allotrope from its starting temperature to the working window temperature. The working period of time may be about less than about 1 minute to about 1440 minutes (i.e., about 24 hours), for example less than 1 minute, about 1 minute to about 10 minutes, about 10 minutes to about 600 minutes (i.e., about 10 hours), about 10 minutes to about 300 minutes (i.e., about 5 hours), about 10 minutes to about 1200 minutes (i.e., about 20 hours), about 10 minutes to about 1440 minutes (i.e., about 24 hours), about 20 minutes to about 600 minutes (i.e., about 10 hours), about 20 minutes, about 1 hour, about 3 hours, about 5 hours, about 10 hours, about 20 hours, about 24 hours, etc. The pores (e.g., holes, etc.) created in the provided carbon allotrope may range in size from a radius of about 1 nanometer to about 100 nanometers, such as pores having radii from about a few nanometers to about 100 nanometers, about 10 nanometers to about 100 nanometers, about 1 nanometer to about 20 nanometers, about 10 nanometers to about 20 nanometers, etc. A few nanometers is defined as any number of nanometers found within the range of about 2 to about 9 nanometers. The various working window temperatures and working periods of time discussed above may be used together in any combination of working window temperature and working periods of time to create pores of the sizes discussed above. The result of the heating the provided carbon allotrope at the working window temperature for the working period of time may be the formation of pores in the carbon allotrope via oxidation, thereby forming a holey carbon allotrope, without requiring the addition of solvents, catalysts, flammable gasses, additional chemical agents, or electrolysis.

Potential applications of the holey carbon allotropes produced by the various embodiments may include use as electrode platforms for energy storage applications, such as supercapacitors or batteries, use as lightweight composite fillers, use as stretchable electronic devices, use in thermoelectric applications, use as improved substrates for catalysts, use as improved materials for alternate fuel (hydrogen storage, etc.), and use as improved materials for drug and gene delivery.

EXPERIMENTAL DETAILS

In a series of experiments described below, some of the various embodiment methods and resulting embodiment holey carbon allotropes were analyzed. Materials tested included graphene powder, MWNTs with a diameter range of about 20 to about 150 nanometers, CNT sheets, and SWCNT sheets. All materials and chemicals were used as received.

A Hitachi S-5200 high resolution scanning electron microscope (HRSEM) equipped with a cold field-emission source was used. Secondary electron (SE) and transmitted electron (TE) modes were used to capture secondary electron micrographs and transmitted electron micrographs, respectively. Electron diffraction patterns and the corresponding TEM images were acquired on a JEOL 2000 field-emission TEM system. Brunauer-Emmett-Teller (BET) surface area measurements were conducted on a Quantachrome Nova 2200e Surface Area and Pore Size Analyzer system.

100 milligrams of graphene powder was placed into a ceramic boat and inserted into an open-ended tube furnace. The furnace was heated to 400° C. at a heating rate of 10° C./min and held isothermally for three hours. The sample was cooled down and collected as the final holey graphene material.

Figure 2A:
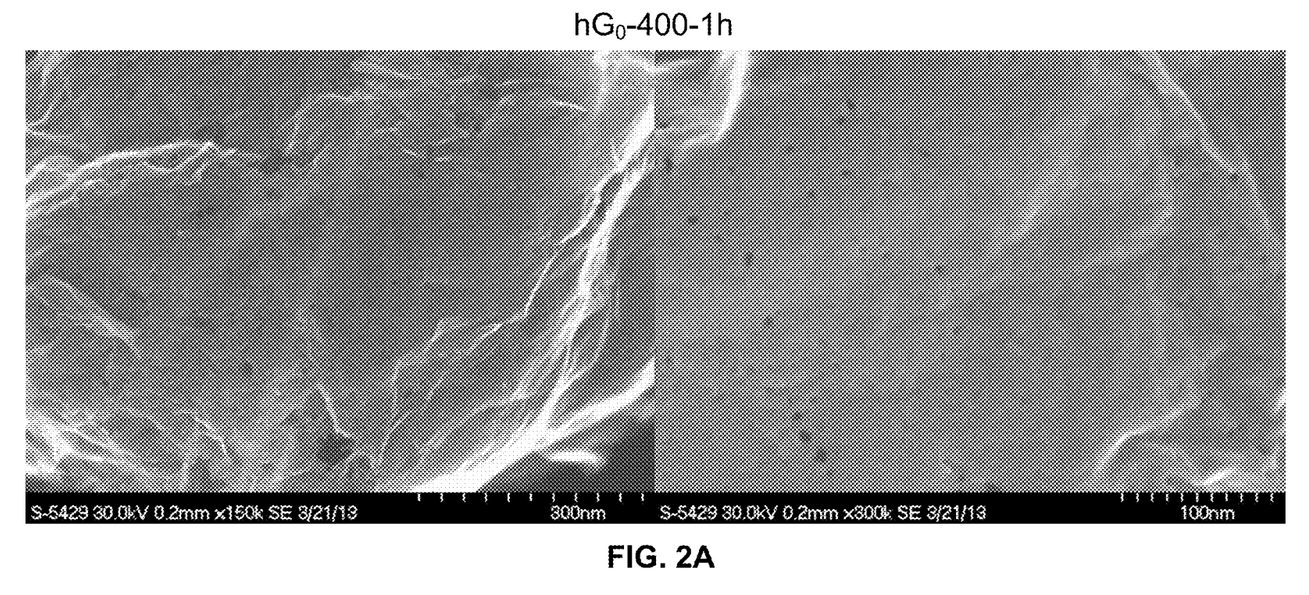
FIGS. 2A-2D are side by side scanning electron micrographs of resulting holey graphene materials at 150 k and 300 k magnifications.
Figure 2B:
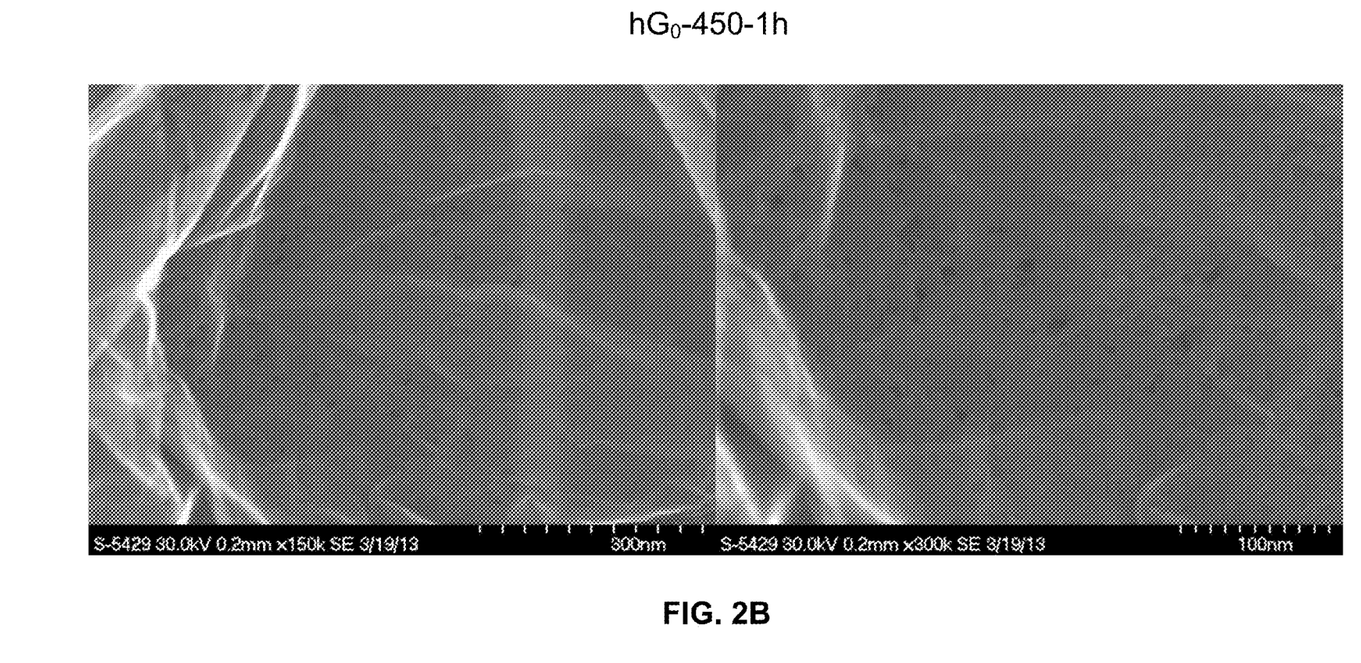
Figure 2C:
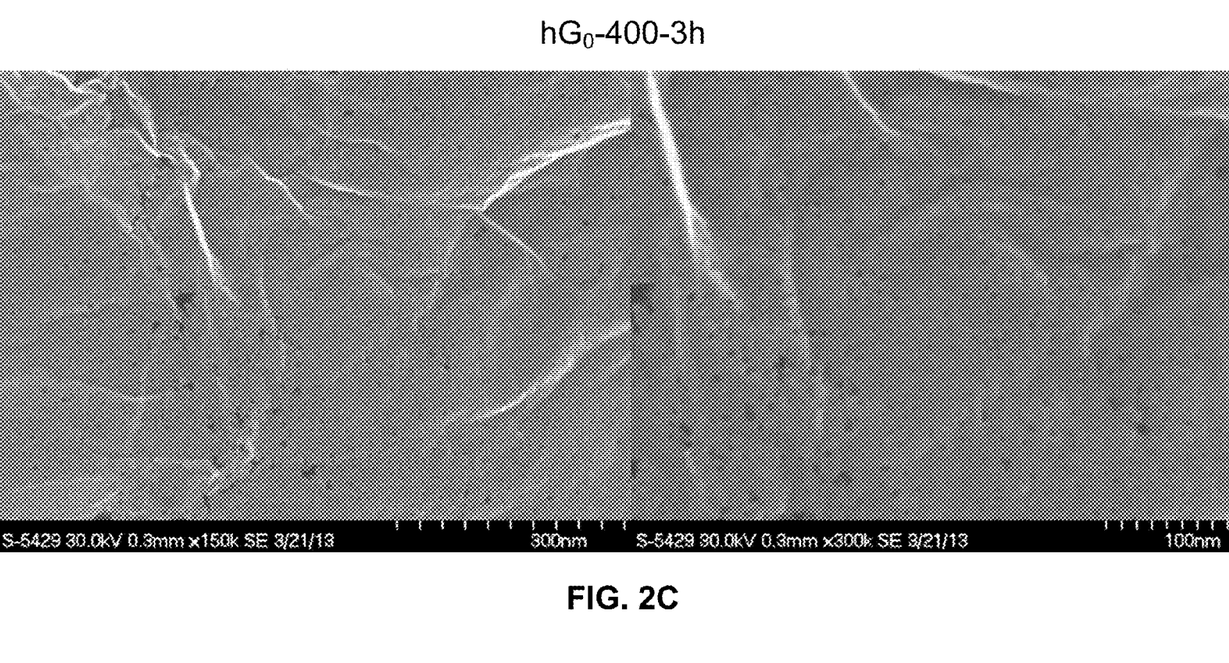
Figure 2D:
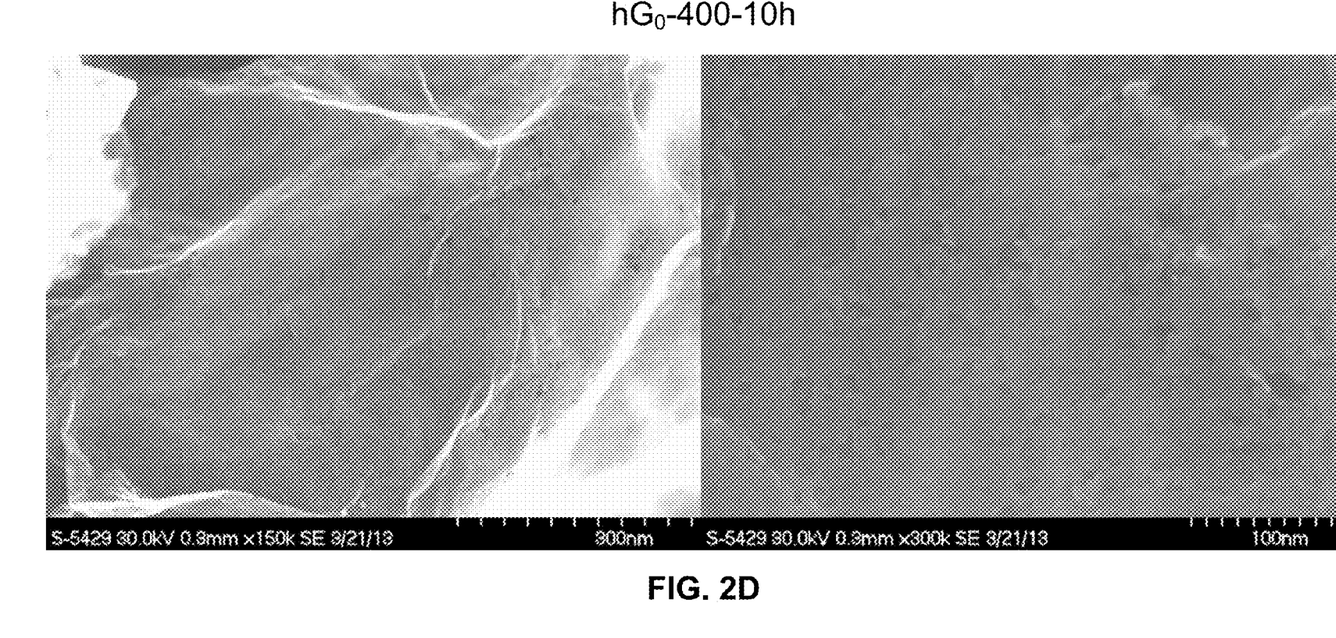

Carbon allotrope materials that were tested included graphene, single-walled CNTs, multi-walled CNTs, and commercial carbon nanotube sheets. The heating temperature (i.e., the working window temperature) was varied between 400° C. to 550° C. The heating time (i.e., the working period of time) was varied between 20 minutes and 10 hours. FIGS. 2A-2D are side by side scanning electron micrographs of resulting holey graphene materials at 150 k magnification and 300 k magnification. The holey graphene materials shown in FIGS. 2A-2D were obtained from catalyst-free preparation by heating in air for different working periods of time at different working window temperatures. FIG. 2A shows side by side scanning electron micrographs of resulting holey graphene materials at 150 k magnification and 300 k magnification from graphene material heated at a working window temperature of 400° C. for one hour. FIG. 2B shows side by side scanning electron micrographs of resulting holey graphene materials at 150 k magnification and 300 k magnification from graphene material heated at a working window temperature of 450° C. for one hour. FIG. 2C shows side by side scanning electron micrographs of resulting holey graphene materials at 150 k magnification and 300 k magnification from graphene material heated at a working window temperature of 400° C. for three hours. FIG. 2D shows side by side scanning electron micrographs of resulting holey graphene materials at 150 k magnification and 300 k magnification from graphene material heated at a working window temperature of 400° C. for ten hours.

Figure 3:
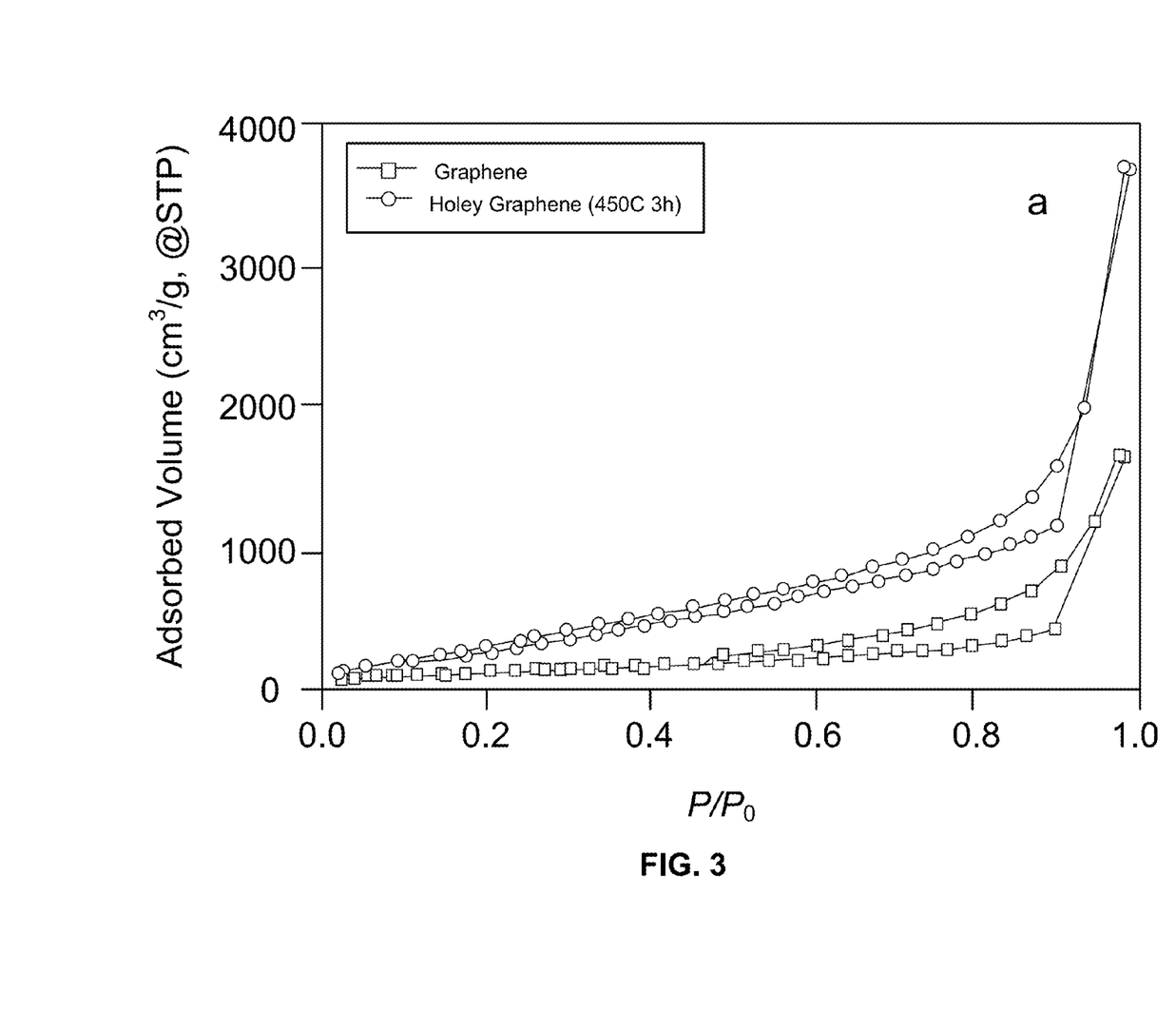
FIG. 3 illustrates BET surface area estimates from isotherms of holey graphene prepared by heating in air at 450° C. for three hours and a starting graphene sample.
Figure 4:
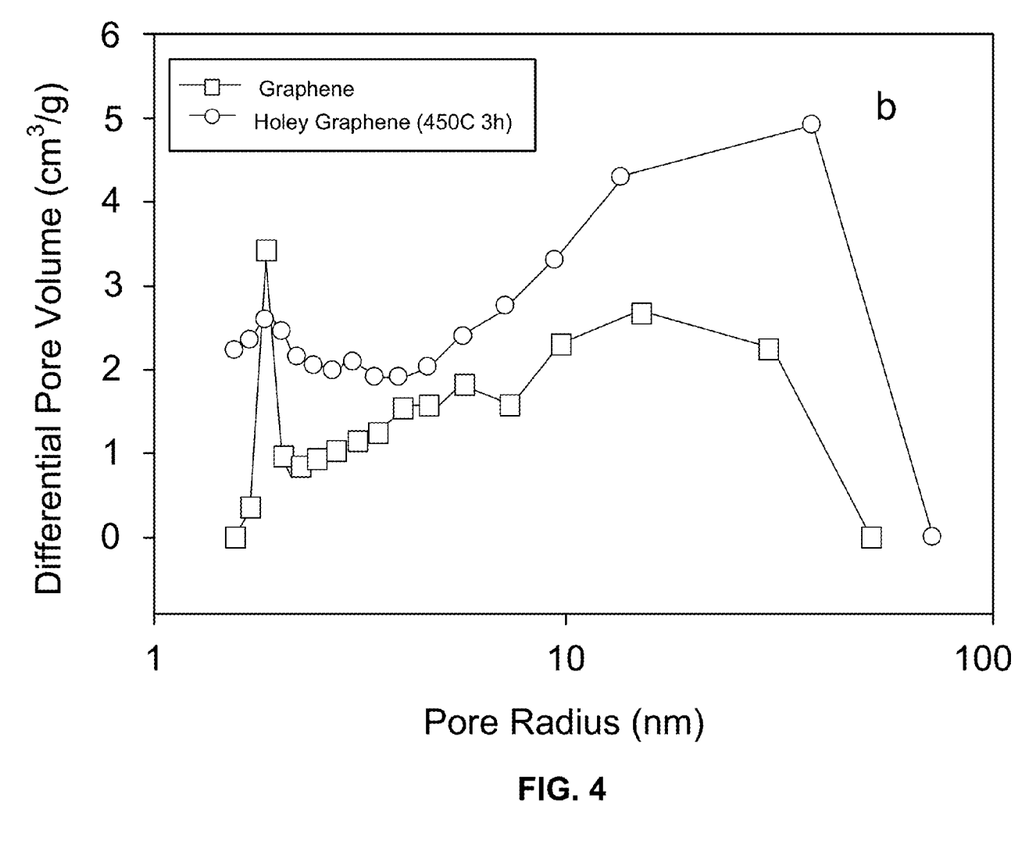
FIG. 4 is a graph illustrating differential pore volume data (calculated according to the Barrett, Joyner, and Halenda (BJH) method) from isotherms of holey graphene prepared by heating in air at 450° C. for three hours and a starting graphene sample.

The pore volume and radius of the samples was characterized using the nitrogen adsorption desorption technique. Isotherms of holey graphene prepared by heating in air at 450° C. for three hours and the starting graphene sample were compared. FIG. 3 is a graph illustrating the BET surface area estimates from the isotherms of holey graphene prepared by heating in air at 450° C. for three hours and the starting graphene sample. The BET surface areas are estimated for the isotherms in the $P/P_0$=0.03-0.30 region for the two samples and were 1280 and 461 $m^2$/g, respectively. FIG. 4 is a graph illustrating differential pore volume data (calculated according to the Barrett, Joyner, and Halenda (BJH) method) from the isotherms of holey graphene prepared by heating in air at 450° C. for three hours and the starting graphene sample. After hole generation, the fraction of the smaller pore radius (~1.9 nanometers (nm)) became much less, while that of the larger pore radius (>10 nm) significantly increased.

Figure 5:
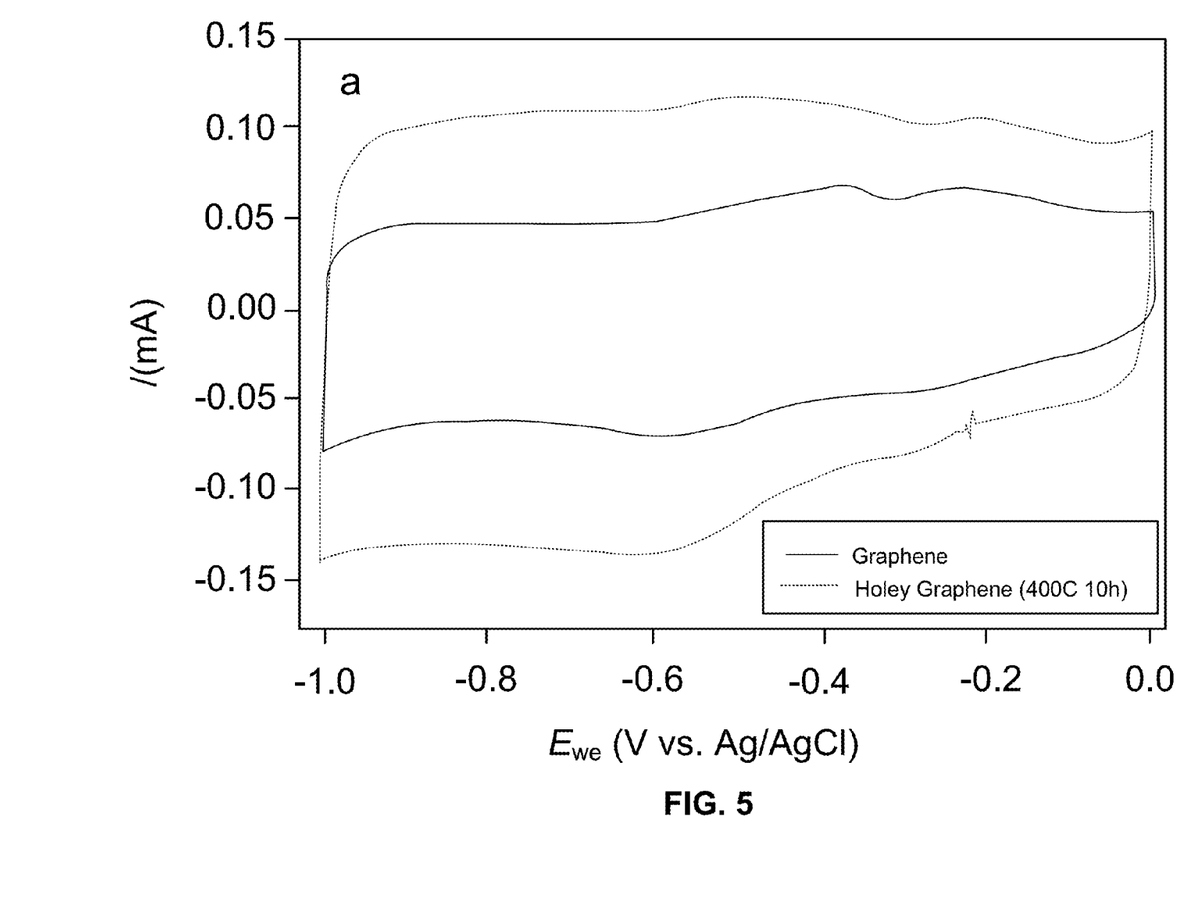
FIG. 5 is a graph illustrating the cyclic voltammetry curve of a holey graphene sample obtained from heating at 400° C. for 10 hours in comparison to the starting graphene sample at scan rate of 100 mV/s.
Figure 6:
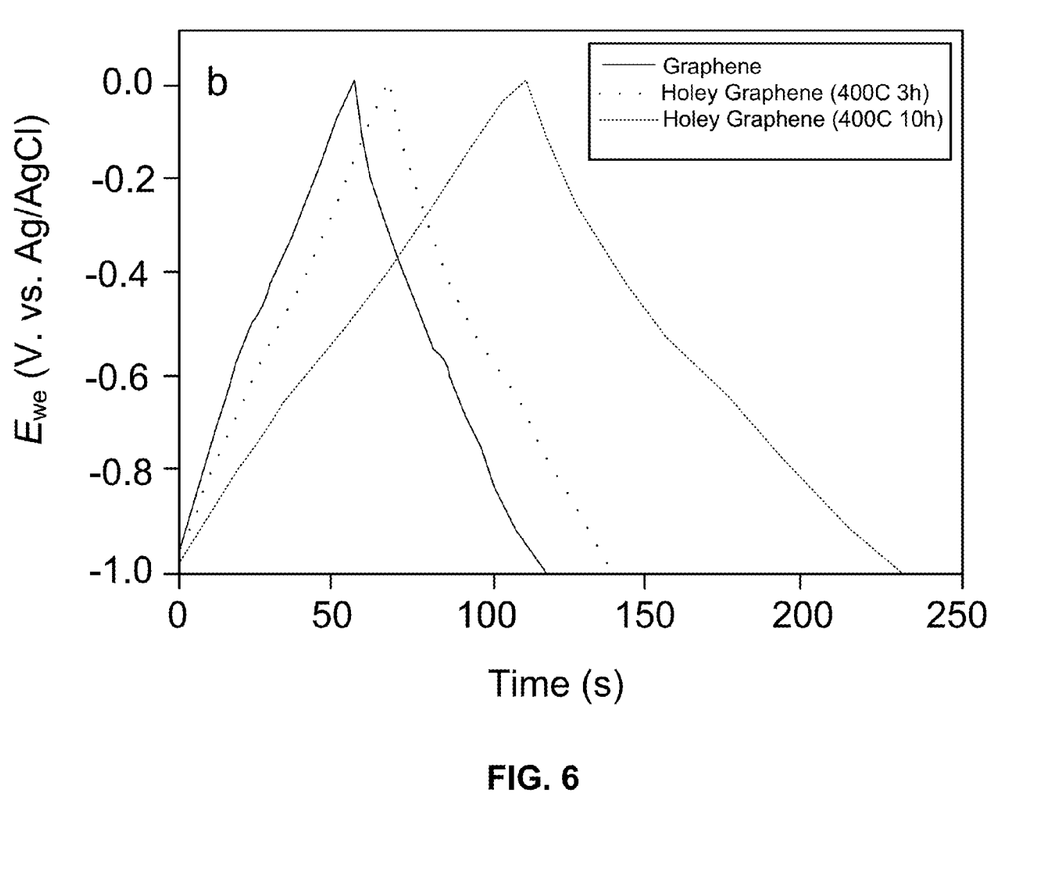
FIG. 6 is a graph illustrating the charge-discharge properties of the starting graphene in comparison with different holey graphene samples prepared by heating in air at 400° C. for 3 hours and 10 hours, respectively.
Figure 7:
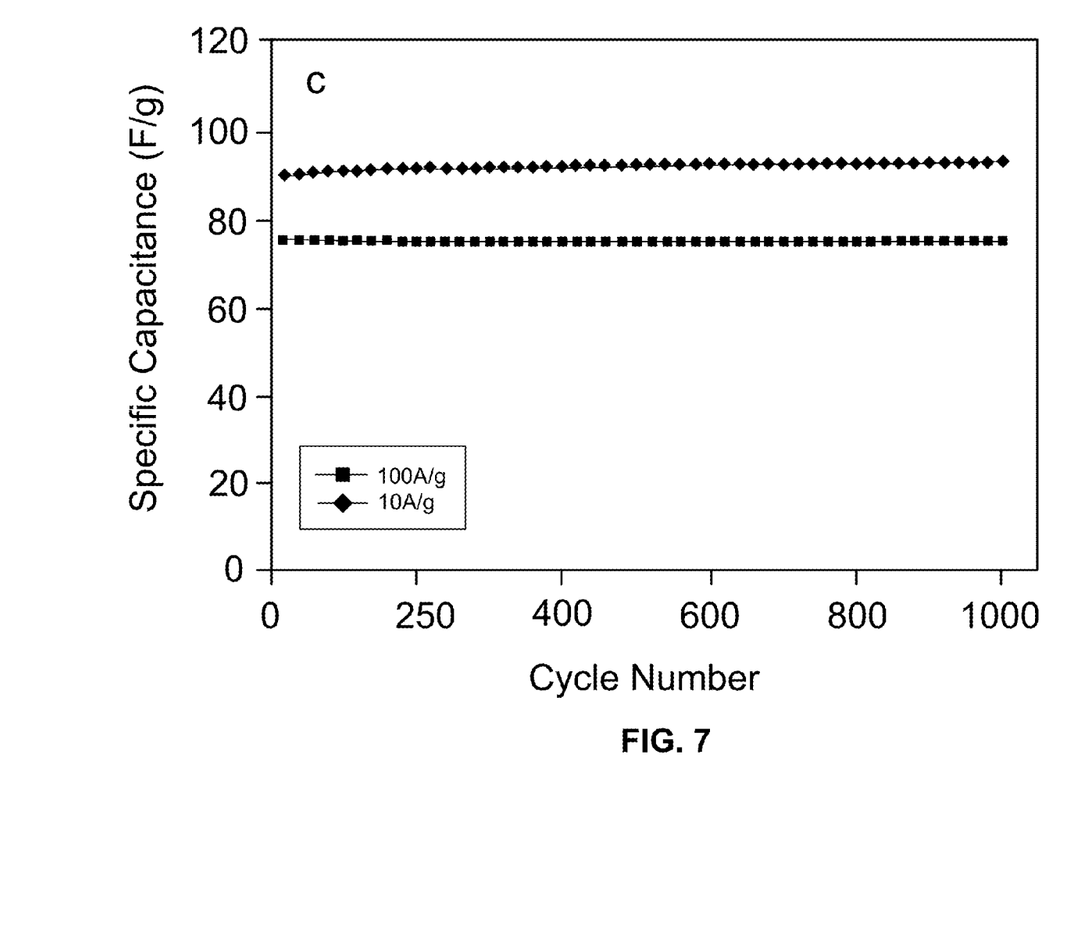
FIG. 7 is a graph illustrating cycling performance of a holey graphene sample prepared by heating in air at 400° C. for 10 hours at high current densities of 10 A/g and 100 A/g.

Additionally, supercapacitor performance of holey graphenes prepared from catalyst-free methods was determined. FIG. 5 is a graph illustrating the cyclic voltammetry curve of a holey graphene sample obtained from heating at 400° C. for 10 hours in comparison to the starting graphene sample at scan rate of 100 mV/s. The larger enclosed area of the CV curve quantitatively suggests the improvement of capacitance. FIG. 6 is a graph illustrating the charge-discharge properties of the starting graphene in comparison with different holey graphene samples prepared by heating in air at 400° C. for 3 hours and 10 hours, respectively. The longer discharge time quantitatively suggests the improvement of capacitance. FIG. 7 is a graph illustrating cycling performance of a holey graphene sample prepared by heating in air at 400° C. for 10 hours at high current densities of 10 A/g and 100 A/g.

Figure 8:
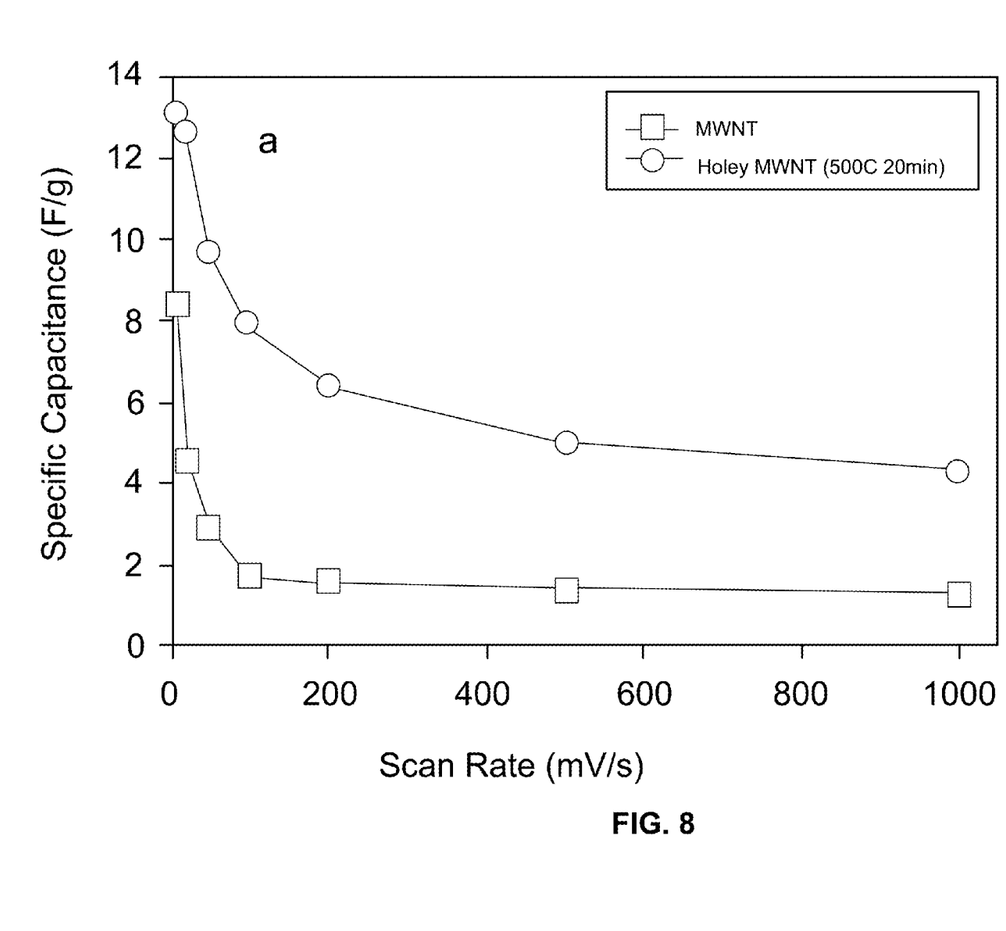
FIG. 8 is a graph illustrating specific capacitance data at different scan rates for holey multi-walled carbon nanotubes (MWNTs) obtained from heating at 500° C. for 20 min in comparison with the starting MWNTs.
Figure 9:
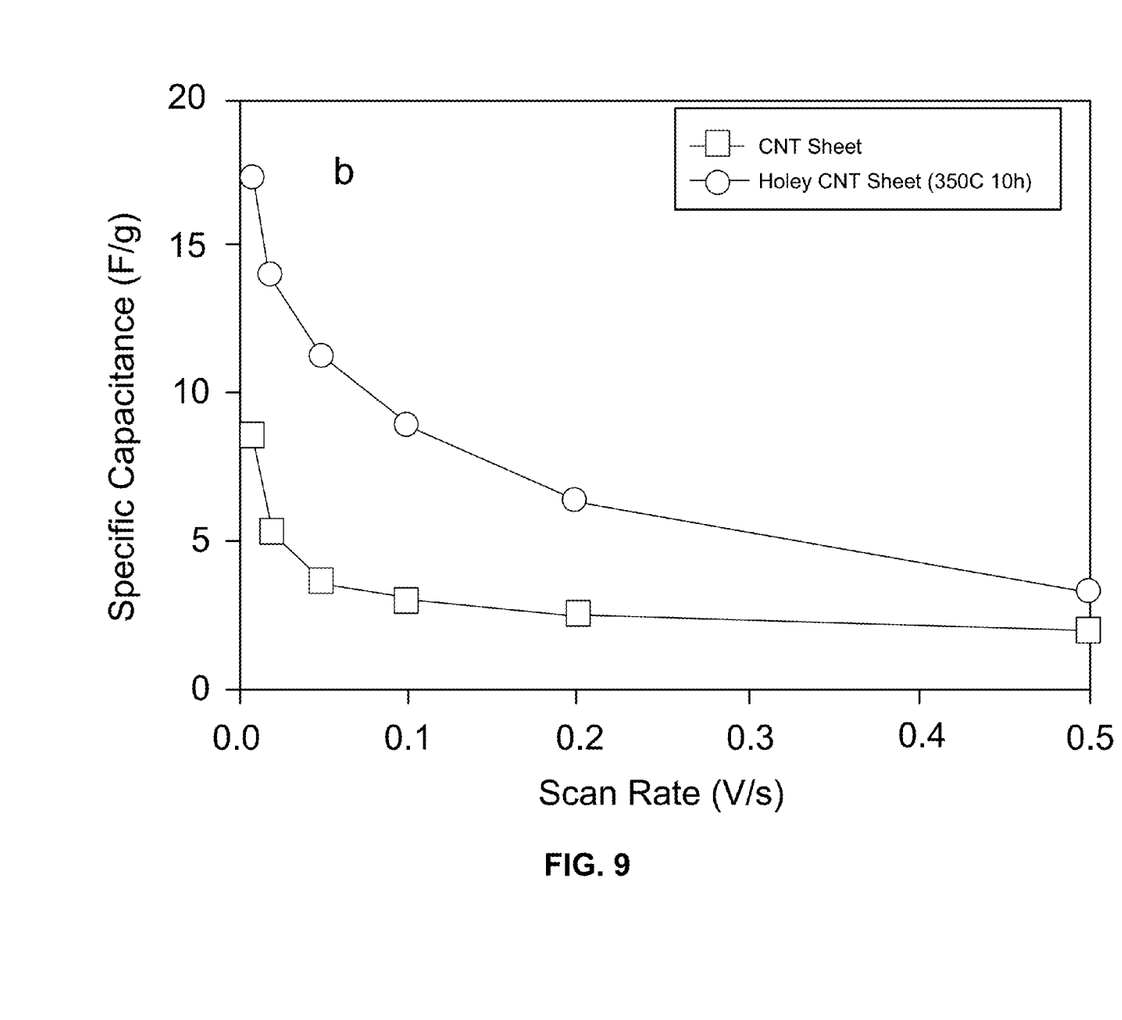
FIG. 9 is a graph illustrating specific capacitance data at different scan rates for holey carbon nanotube sheet (CNT sheet) obtained from heating at 350° C. for 10 hours in comparison with the starting CNT sheet.

Improved supercapacitor performance of holey carbon nanotube (CNT) prepared from catalyst-free methods was also demonstrated. FIG. 8 is a graph illustrating specific capacitance data at different scan rates for holey MWNTs obtained from heating at 500° C. for 20 min in comparison with the starting MWNTs. FIG. 9 is a graph illustrating specific capacitance data at different scan rates for holey CNT sheet obtained from heating at 350° C. for 10 hours in comparison with the starting CNT sheet.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A method of forming a holey carbon allotrope, comprising:
   providing a carbon allotrope; and
   heating the provided carbon allotrope in air at a working window temperature for a working period of time at atmospheric pressure to create pores in the provided carbon allotrope;
   wherein heating the provided carbon allotrope is performed without the addition of solvents, catalysts, or additional chemical agents; and
   wherein the working window temperature is from about 100° C. to about 800° C. and
   the working period of time is from about 1 minute to about 24 hours.

2. The method of claim 1, wherein the created pores have a radius size of about 1 nanometer to about 100 nanometers.

3. The method of claim 2, wherein heating the provided carbon allotrope at the working window temperature for the working period of time to create pores in the provided carbon allotrope is performed without the addition of flammable gasses or electrolysis.

4. The method of claim 2, wherein heating the provided carbon allotrope is performed by thermal heating, mechanical heating, microwave heating, infrared heating, laser beam heating, mechanochemical heating, electrochemical heating, electron bombardment, ion bombardment, electromagnetic heating, or any combination of the foregoing.

5. The method of claim 2, wherein the working window temperature is from about 150° C. to about 500° C.

6. The method of claim 5, wherein the working window temperature is from about 300° C. to about 500° C.

7. The method of claim 2, wherein:
   the working window temperature is about 400° C. or more; and
   the working period of time is about 1 hour.

8. The method of claim 7, wherein the working window temperature is about 450° C.

9. The method of claim 2, wherein:
   the working window temperature is about 400° C. or more; and
   the working period of time is about 3 hours.

10. The method of claim 9, wherein the working window temperature is about 450° C.

11. The method of claim 2, wherein:
    the working window temperature is about 350° C. or more; and
    the working period of time is about 10 hours.

12. The method of claim 11, wherein the working window temperature is about 400° C.

13. The method of claim 2, wherein:
    the working window temperature is about 500° C. or more; and
    the working period of time is about 20 minutes.

14. The method of claim 13, wherein the working window temperature is about 500° C.

15. The method of claim 2, wherein the provided carbon allotrope is at least one selected from the group consisting of graphene, graphene oxide, reduced graphene oxide, thermal exfoliated graphene, graphene nanoribbons, graphite, exfoliated graphite, expanded graphite, single-walled carbon nanotubes, double-walled carbon nanotubes, few-walled carbon nanotubes, multi-walled carbon nanotubes, carbon nanofibers, carbon fibers, carbon black, amorphous carbon, and fullerenes.

16. The method of claim 2, wherein a form of the provided carbon allotrope is at least one selected from the group consisting of a sheet, a mat, a roving, a yarn, a thread, and a filament.

17. The method of claim 16, wherein constituents of the form of the provided carbon allotrope are at least partially aligned in a same direction.

18. The method of claim 1, wherein the pores of the holey carbon allotrope have a radius size of about 1 nanometer to about 20 nanometers and wherein the BET surface area of the holey carbon allotrope is at least 461 $m^2/g$.

19. The method of claim 16,
    wherein an electrode is formed from the holey carbon allotrope, and
    wherein the pores of the holey carbon allotrope have a radius size of about 1 nanometer to about 20 nanometers and wherein the BET surface area of the holey carbon allotrope is at least 461 $m^2/g$.

* * * * *